(12) United States Patent  
Granger

(10) Patent No.: US 6,639,659 B2
(45) Date of Patent: Oct. 28, 2003

(54) MEASURING METHOD FOR DETERMINING THE POSITION AND THE ORIENTATION OF A MOVING ASSEMBLY, AND APPARATUS FOR IMPLEMENTING SAID METHOD

(76) Inventor: Romain Granger, 12 Chemin du Tripot, 41800 Lavardin (FR)

( * ) Notice: Subject to any disclaimer, the term of this patent is extended or adjusted under 35 U.S.C. 154(b) by 0 days.

(21) Appl. No.: 10/131,293

(22) Filed: Apr. 24, 2002

(65) Prior Publication Data

US 2002/0152622 A1 Oct. 24, 2002

(30) Foreign Application Priority Data

Apr. 24, 2001 (FR) .............................................. 01 05484

(51) Int. Cl.[7] .......................... G01B 11/26; H04N 7/18; G06K 9/00
(52) U.S. Cl. .............. 356/152.1; 356/4.01; 356/139.03; 348/94; 382/103; 702/168
(58) Field of Search ...................... 382/103; 356/152.1, 356/139.03, 4.01, 601; 348/94, 95; 702/168

(56) References Cited

U.S. PATENT DOCUMENTS 4,513,504 A    4/1985   Nussbaumer et al.
5,148,591 A    9/1992   Pryor

FOREIGN PATENT DOCUMENTS

| | | |
|---|---|---|
| DE | 4041723 | 6/1992 |
| EP | 0149690 | 7/1985 |
| EP | 1003013 | 5/2000 |
| WO | 9848241 | 10/1998 |

*Primary Examiner*—Stephen C. Buczinski
(74) *Attorney, Agent, or Firm*—McCormick, Paulding & Huber LLP

(57) ABSTRACT

The invention relates to a measurement method for determining the position and the orientation of a moving assembly in a base frame of reference. According to the invention, the method comprises the steps of: taking an image of an optical reference mark associated with the moving assembly by means of a first camera having a focal axis lying in a direction that is known in the base frame of reference; taking an image of an optical reference mark associated with the first camera by means of a second camera associated with the moving assembly; measuring the distance between a point associated with the first camera and a point associated with the second camera by using self-contained measurement means that are independent of said first and second cameras; and computing the position and the orientation of the moving assembly in the base frame of reference on the basis of the images taken and of the measured distance.

12 Claims, 2 Drawing Sheets

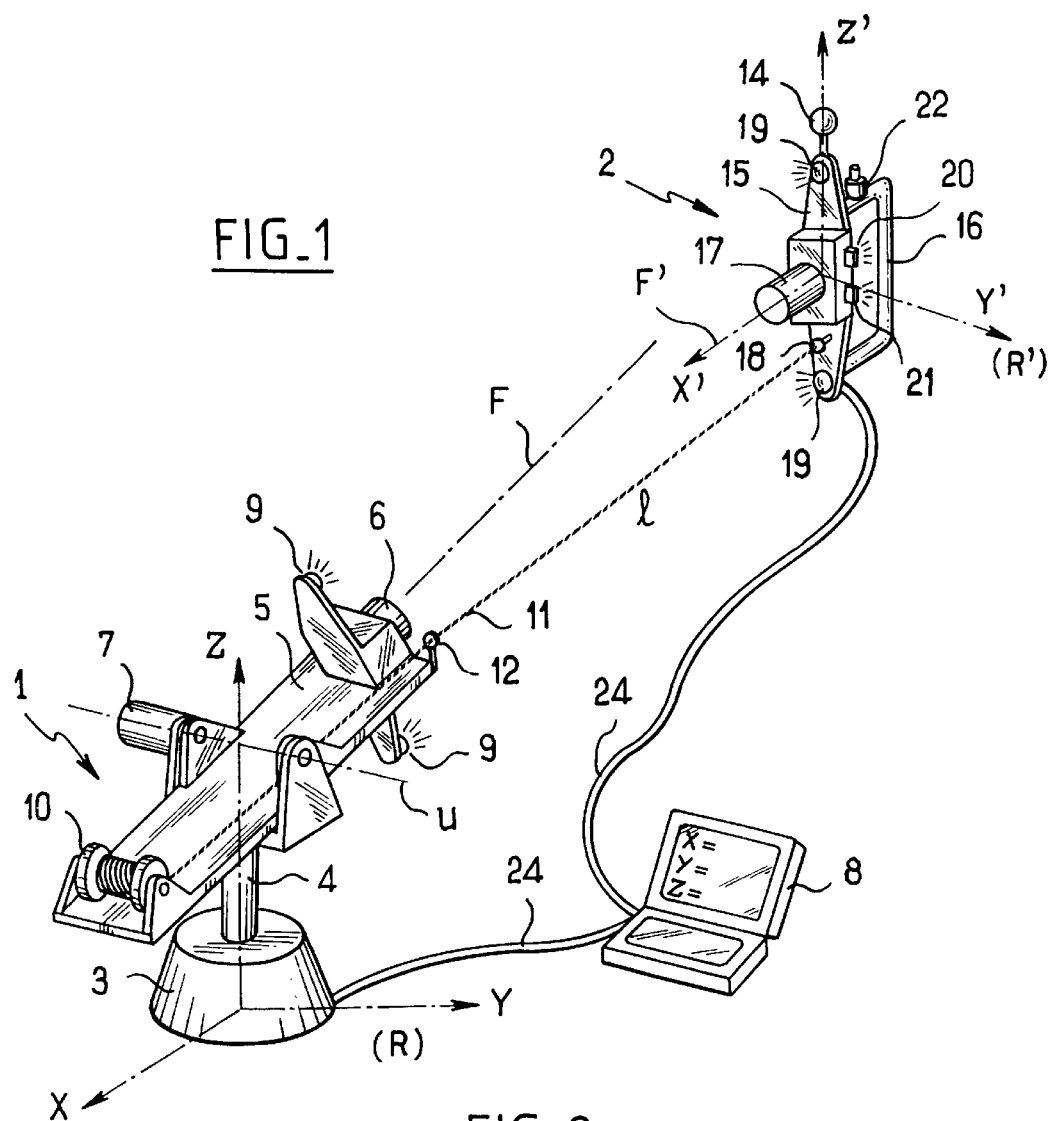
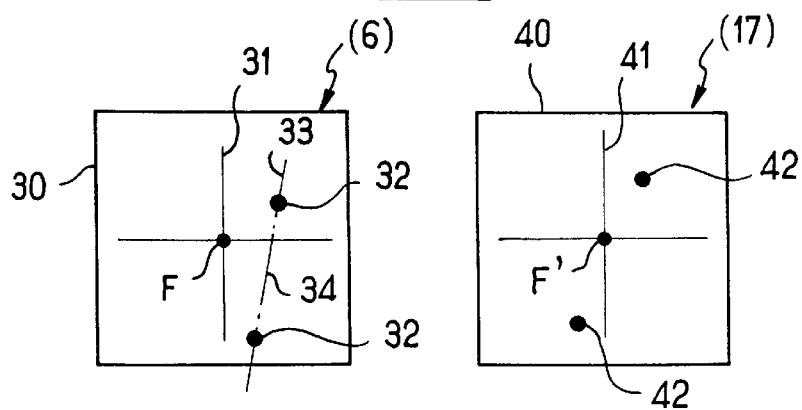

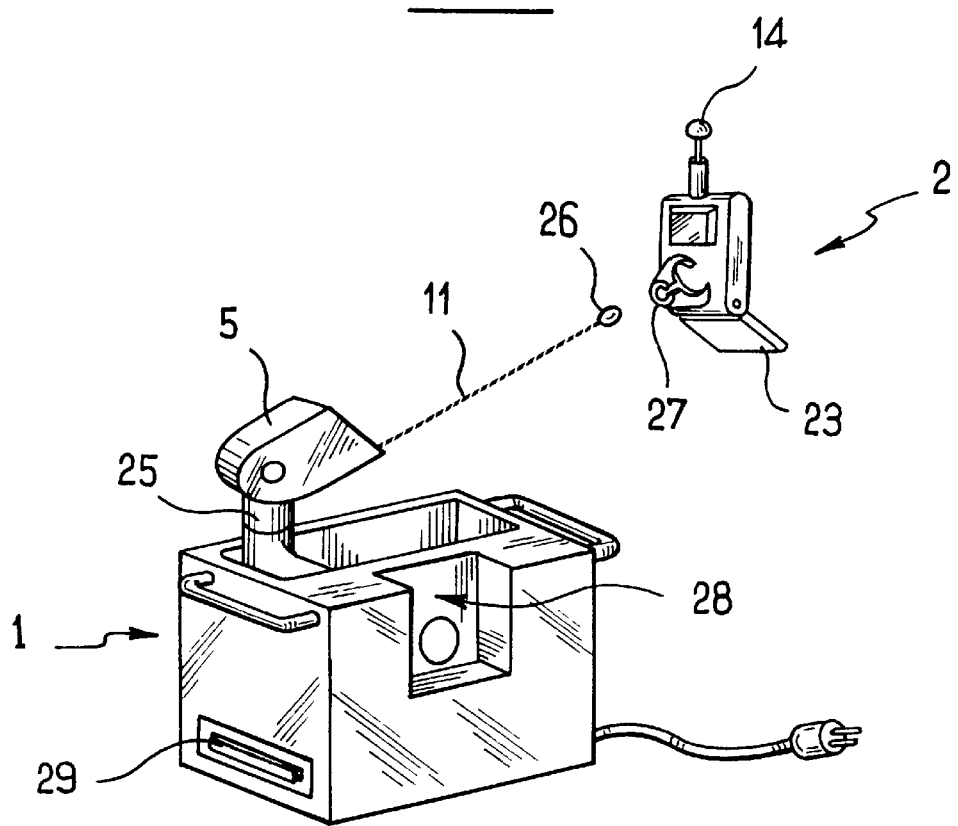

MEASURING METHOD FOR DETERMINING THE POSITION AND THE ORIENTATION OF A MOVING ASSEMBLY, AND APPARATUS FOR IMPLEMENTING SAID METHOD

This application is entitled to the benefit of and incorporates by reference essential subject matter disclosed in French Patent Application No. 01 05484 filed on Apr. 24, 2001.

The invention relates in particular to apparatus for use in vehicle body building to measure deformations or to verify that bodywork assemblies are properly positioned relative to the remainder of a structure.

BACKGROUND OF THE INVENTION

In this field, measurement devices are known of the type comprising a base having a hinged arm connected thereto, the arm having an end support carrying a feeler ball.

Each hinge of the arm is fitted with an encoder, so that it suffices to collect the measurements from each of the encoders in order to determine the orientation of the end support and the position of the feeler ball in a frame of reference associated with the base.

That type of apparatus is transportable, but it is sometimes heavy and bulky, and even when folded the arm projects considerably from the base.

Furthermore, when deployed, the arm is fragile and can be twisted during clumsy handling, thereby completely falsifying any determination of the orientation of the end support or of the position of the feeler ball, thus making the apparatus unusable.

Finally, the presence of numerous mechanical parts and high precision hinges makes that type of apparatus expensive to produce.

Document EP-A-1 003 013 describes a method of determining the position of a reference mark associated with a camera by taking a image of the reflections in a mirror of reference marks associated with the camera. That method is used for identifying the position and the orientation of the wheels of a motor vehicle.

In analogous manner, document DE-A-4 041 723 describes a method of identifying the position of a reference mark by means of a plurality of cameras placed to form pairs of cameras looking at each other, with one of the cameras in each pair of cameras being secured to a camera in an adjacent pair. The major drawback of those methods lies in the lack of accuracy with which distances are measured by analyzing images, which puts a de facto limit on the accuracy with which precision can be identified.

To complete the technological background of the invention, mention is made of document U.S. Pat. No. 5,148,591 which teaches a method of optically guiding a handling robot, of documents U.S. Pat. No. 4,513,504 and EP-A-0 149 690 which teach determining the curvature of a pipe by means of a plurality of cameras placed one after another, and finally of document WO-A-98/48241 (U.S. Pat. No. 6,279,246) which teaches determining the position of a point with the help of an object which is moved into various positions.

OBJECTS AND SUMMARY OF THE INVENTION

An object of the invention is to provide a measurement method and apparatus for implementing the method that do not present the above-specified drawbacks.

To this end, the invention provides a measurement method for determining the position and the orientation of a moving assembly in a given frame of reference, the method comprising the following steps:

taking an image of an optical reference mark associated with the moving assembly by means of a first camera having a focal axis lying in a direction that is known in the base frame of reference;

taking an image of an optical reference mark associated with the first camera by means of a second camera associated with the moving assembly;

measuring the distance between a point associated with the first camera and a point associated with the second camera by using self-contained measurement means that are independent of said first and second cameras; and computing the position and the orientation of the moving assembly in the base frame of reference on the basis of the images taken and of the measured distance.

The images of the optical reference marks make it possible to determine relative rotation between the two optical reference marks and also relative offset between the two optical reference marks in a plane normal to the focal axis of the first camera. Distance measurement makes it possible to determine the distance between the two optical reference marks, and to do so very accurately because of the self-contained nature of the measurement means used which does not depend on the cameras, unlike the previously known methods outlined above.

The relative position and orientation of the second optical reference mark are thus known relative to the first optical reference mark.

The position of the first optical reference mark is associated with the direction of the focal axis of the first camera. The position and the orientation of the moving assembly can thus be deduced in the given base frame of reference.

For a moving assembly fitted with a feeler ball, the above method is advantageously enriched by an additional step which consists in determining the position of the center of the feeler ball in the base frame of reference.

The invention also provides measurement apparatus for implementing the above method, the apparatus comprising a first assembly carrying the first camera and the associated optical reference marks, and a second assembly carrying the second camera and the associated optical reference marks, said apparatus further including measurement means for measuring the distance between a point of the first assembly and a point of the second assembly, said measurement means being self-contained and independent of said first and second cameras, and a computer interfaced with both cameras and with the distance-measuring means, said computer being arranged to compute the position and the orientation of the moving assembly in the base frame of reference.

Preferably, the second moving assembly is also fitted with a feeler ball, and the computer is arranged to determine the position of the center of the feeler ball in the base frame of reference.

In which case, advantageously, the second assembly includes a handle-forming support having the second camera and the associated optical reference mark fitted thereto, together with the feeler ball.

Also advantageously, the second assembly can be detachably received by the first assembly. This makes the apparatus easier to transport. Similarly, the computer is advantageously carried by the first assembly.

Preferably, the first assembly comprises a stand standing on the ground together with a cradle movably mounted on the stand and carrying the first camera and the associated optical reference mark.

It is then advantageous for the cradle to be associated with the stand by a cardan type mount.

Also preferably, the self-contained measurement means comprises a winder fitted to the first assembly, the winder receiving a line having one end attached to a point of the second assembly. The winder is then advantageously fitted to the cradle.

Finally, the apparatus is preferably fitted with signaling means for indicating whether the optical reference mark associated with the second camera is in the field of view of the first camera while the optical reference mark associated with the first camera is simultaneously in the field of view of the second camera.

BRIEF DESCRIPTION OF THE DRAWINGS

Other characteristics and advantages of the invention appear more clearly in the light of the following description of particular non-limiting embodiments of the invention. Reference is made to the accompanying drawings and to the figures, in which:

FIG. 1 is a perspective view of measurement apparatus in accordance with the invention implementing the method of the invention;

FIG. 2 is a diagram of images taken by the two cameras of the apparatus shown in FIG. 1; and FIG. 3 is a perspective view of measurement apparatus constituting a variant embodiment of the invention.

MORE DETAILED DESCRIPTION

With reference to FIG. 1, measurement apparatus of the invention comprises a first assembly or base 1 and a second or "moving" assembly 2.

The base 1 comprises a stand 3 standing on the ground and carrying a fork 4 which is mounted to rotate about a vertical Z-axis. An encoder (not visible in the drawing) serves to measure the angular position of the fork 4 about the Z-axis, taking as its origin an X-axis perpendicular to the Z-axis and of orientation that is fixed relative to the stand 3.

A Y-axis perpendicular both to the X-axis and to the Z-axis serves to define a frame of reference R referred to as the "base" frame of reference.

The fork 4 carries a cradle 5 hinged to the fork about an axis U contained in a plane that is normal to the Z-axis. Tilting of the cradle about the axis U is measured using an associated encoder 7.

The cradle 5 also carries a first camera 6 defining a focal axis F. By measuring both turning of the cradle 5 about the Z-axis and tilting of the cradle about the axis U, a computer connected to both above-mentioned encoders can determine at all times the direction of the focal axis F of the first camera 6 in the frame of reference R, merely by performing trigonometrical computations.

The cradle 5 also carries means for measuring distance in a manner that is self-contained and independent of the cameras 6, 17. Specifically, this self-contained measurement means is constituted by a winder 10 receiving a line 11 and exerting tension continuously thereon. The line 11 passes through a line-guide 12 defining a reference point of the cradle 5.

The moving assembly 2 comprises a support 15 fitted with a handle 16 and in this case carrying a feeler ball 14. The support 15 is fitted with a second camera 17 of focal axis F' and includes a fastening 18 for holding the end of the line 11.

By means of an encoder associated with the winder 10 and interfaced with the computer 8, the length of line that has been unwound is known at all times, thus making it possible to determine very accurately the distance referenced l between the line-guide 12 of the base 1 and the fastening 18 of the moving assembly 2.

Wired connections 24 are provided between the computer 8 and the base 1, and between the computer 8 and the moving assembly 2, firstly to provide electrical power for the various components carried by the base 1 and the moving assembly 2, and secondly to acquire the working information that comes from the encoders or the cameras.

The cradle 5 also has two light emitting diodes (LEDs), while the support 15 has two LEDs 19. In the present example, light is emitted by LEDs, but as a variant it is possible to use any other type of light-emitting means.

The apparatus shown in the figure operates as explained below.

The user holds the moving assembly 2 by means of its handle 6 and moves it so as to bring its feeler ball 14 into a determined position in three dimensions, e.g. a reference point on the structure of a motor vehicle.

The tension in the line 11 between the fastening 18 and the line-guide 12 enables the cradle 5 to be moved while the moving assembly 2 is being moved so that the focal axis F points roughly towards the moving assembly 2. Thus, between the line-guide 12 and the fastening 18, the line 11 departs little from being parallel to the focal axis F. In order to make it easier for the line 11 to move, the cradle 5 is designed to be lightweight and balanced about the axis U.

When the moving assembly 2 is oriented relative to the base 1 so that both LEDs 19 of the moving assembly 2 are simultaneously in the field of view of the first camera 6 associated with the base 1, and both LEDs 9 of the base 1 are in the field of view of the second camera 11 associated with the moving assembly 2, then a green lamp 20 carried by the support 15 of the moving assembly 2 is turned on. Otherwise a red lamp 21 is turned on.

While the green lamp 20 is on, the user can at any moment press on a button 22 on the handle 16 to trigger acquisition by the computer 8 simultaneously of an image taken by the first camera 6, an image taken by the second camera 17, and a measurement of the distance between the line-guide 12 and the fastening 18 by means of the indication from the encoder associated with the winder 10.

The computer 8 is arranged to determine the position of the center of the feeler ball 14 on the basis of the two images it receives and the measured distance, using a procedure which is described in detail below with reference to FIG. 2.

The purpose of the computation is not only to determine the position of the center of the feeler ball 14 in the frame of reference R, but also the positions of the LEDs 19 of the moving assembly 2 and the direction of the focal axis F' of the second camera 17, thus making it possible to determine the position and the orientation in the frame of reference R of a frame of reference R' associated with the moving assembly 2, and represented in FIG. 1 by axes X', Y', and Z' (where the axis X' coincides with the focal axis F').

For this purpose, the computer 8 determines the position of each LED 9 or 19 in each image, by identifying in these images the centers of the light spots associated with each of the LEDs.

In FIG. 2, the square 30 symbolizes the image taken by the first camera 6. The point of intersection of the two graticule lines 31 represents the focal axis F. The image has two points 32 which represent the centers of the LEDs 19 as seen by the first camera 6.

Similarly, the square 40 represents the image taken by the second camera 17. The point of intersection of the two graticule lines 41 represent the focal axis F'. The two points 42 then represent the centers of the LEDs 9 as seen by the second camera 6.

By an iterative procedure, the position of a reference point on the moving assembly is determined in the frame of reference R, where the reference point can be constituted, for example, by the point of intersection 34 between a geometrical construction line 33 joining the points 32 representing the centers of the LEDs 19 and the focal axis F' of the second camera 17.

Then the focal axis F' and the construction line 33 are caused to turn about the point 34 until the calculated position for the centers of the LEDs in each image coincide in the images 30 and 40.

This serves to determine the position and the orientation (i.e. the direction cosines) in the frame of reference R of the reference mark R' associated with the moving assembly 2.

The cameras 6 and 17 make it possible to obtain fine measurements of offsets in a plane perpendicular to their focal axes, and also of angular positions about the corresponding focal axes. However, the cameras are less capable of assessing distances along their focal axes, or angles about axes that are perpendicular to their focal axes.

To compensate for this first weakness of cameras, use is made of the distance measurement provided by the encoder associated with the winder 10.

To compensate for the second weakness, the presence of the second camera makes it possible to obtain fine measurement of the angular position of the moving assembly by transforming any rotation of the moving assembly 2 into an offset in the image 40 of the centers of the LEDs 9.

For example, if the user is capable of causing the moving assembly 2 to turn about a line joining the centers of the LEDs 19, such turning is not detectable using the first camera 6 alone. However, such turning will necessarily give rise to the centers of the LEDs 9 being offset in the image 40, thus enabling such turning to be identified.

Once the position and the orientation of the frame of reference R' of the moving assembly 2 has been determined in the frame of reference R, it is easy to deduce the position of the center of the feeler ball 14 in said frame of reference R, since the position of the ball is known exactly in the frame of reference R'.

FIG. 3 shows another embodiment of measuring apparatus comprising the same elements as those described above, but with these elements being arranged differently. The base 1 is implemented as a box and is very compact for ease of transport. The cradle 5 is mounted on a foldable mast 25 suitable for being received in an associated recess provided in the base 1. The end of the line 11 is terminated by a ball 26 suitable for being inserted releasably in a spherical housing 27 of the moving assembly 2, with the center of the ball 26 in the associated housing 27 then constituting the reference point of the moving assembly 2 for measuring distance. The base 1 also possesses a slot 28 for detachably receiving the moving assembly 2, thereby making the apparatus easier to transport and to store. The electronic components of the apparatus are automatically switched into a standby mode whenever the moving assembly 2 is fitted to the base 1.

The computer 8 is then integrated in the base, which has an interface 29 constituted in this case by a serial connector of the RS2323 type enabling the coordinates of the center of the feeler ball 14 to be sent to an external computer.

The moving assembly 2 is of the same size as a mobile telephone, and it is fitted with a small fold-down liquid crystal screen 23 for continuously displaying the coordinates of the center of the feeler ball 14 together with the values of the direction cosines in a frame of reference associated with the moving assembly, having its origin preferably coinciding with the center of the housing 27, and expressed either in the frame of reference R associated with the base 1, or else in any other frame of reference previously prepared by the user, for example by using the feeler ball to feel reference planes of the new frame of reference. The feeler ball 14 is mounted on a telescopic rod. The moving assembly 2 communicates with the base 1 via a radio link.

The invention is not limited to the particular embodiment described above, but on the contrary extends to cover any variant that comes within the scope of the invention as defined by the claims.

Although it is stated above that the means for measuring the distance between the base and the moving assembly comprises a line that is taken up by a winder provided with an encoder, any other distance-measuring means could be considered, providing said means is self-contained and independent of the cameras, for example laser triangulation.

Although the moving assembly is shown as constituting a support for a feeler ball, the moving assembly could be fitted, either additionally or instead, with some other type of sensor, such as a camera or a two-laser fork. Under such circumstances, it is mainly the orientation of the frame of reference associated with the moving assembly that is of interest, and that is obtained by the computer.

Although optical reference marks are shown as being constituted by respective pairs of LEDs, it is possible to use optical reference marks made up of patterns that can be perceived by a camera and of a shape that is adapted to enable the pattern to be identified in an image taken by said camera.

Although the computer is shown connected to the base and to the moving assembly by means of wired connections, the moving assembly could well have its own electrical power supply, such as a battery, and communicate with the computer over a radio link.

Although it is stated that the position of the center of the feeler ball 14 is computed as a result of the user pressing an acquisition button 22, it is possible to devise a real time computation procedure which determines the current position of said center while the moving assembly 2 is moving, with depression of the acquisition button 22 then serving solely to cause the current position of the center of the feeler ball to be stored in memory.

Finally, although it is stated that the cradle 5 is connected to the stand 3 via a cardan type mount, it is possible to imagine any other type of flexible connection associated with sensors that make it possible at all times to identify the position of a frame of reference associated with the camera 6 relative to the frame of reference R.

What is claimed is:

1. A measurement method for determining the position and the orientation of a moving assembly in a given frame of reference, the method comprising the following steps:

taking an image of an optical reference mark associated with the moving assembly by means of a first camera having a focal axis lying in a direction that is known in the base frame of reference;

taking an image of an optical reference mark associated with the first camera by means of a second camera associated with the moving assembly;

measuring the distance between a point associated with the first camera and a point associated with the second camera by using self-contained measurement means that are independent of said first and second cameras; and computing the position and the orientation of the moving assembly in the base frame of reference on the basis of the images taken and of the measured distance.

2. A method according to claim 1, including an additional step of determining the position in the base frame of reference of the center of a feeler ball associated with the moving assembly.

3. Measurement apparatus for implementing the method according to claim 1, the apparatus comprising a first assembly carrying the first camera and the associated optical reference marks, and a second assembly carrying the second camera and the associated optical reference marks, said apparatus further including measurement means for measuring the distance between a point of the first assembly and a point of the second assembly, said measurement means being self-contained and independent of said first and second cameras, and a computer interfaced with both cameras and with the distance-measuring means, said computer being arranged to compute the position and the orientation of the moving assembly in the base frame of reference.

4. Measurement apparatus according to claim 3, wherein the second moving assembly is also fitted with a feeler ball, and the computer is arranged to determine the position of the center of the feeler ball in the base frame of reference.

5. Measurement apparatus according to claim 4, wherein the second assembly includes a handle-forming support having the second camera and the associated optical reference mark fitted thereto, together with the feeler ball.

6. Measurement apparatus according to claim 3, wherein the second assembly can be detachably received by the first assembly.

7. Measurement apparatus according to claim 3, wherein the computer is carried by the first assembly.

8. Measurement apparatus according to claim 3, wherein the first assembly comprises a stand standing on the ground together with a cradle movably mounted on the stand and carrying the first camera and the associated optical reference mark.

9. Measurement apparatus according to claim 8, wherein the cradle is associated with the stand by a cardan type mount.

10. Measurement apparatus according to claim 3, wherein the self-contained measurement means comprises a winder fitted to the first assembly, the winder receiving a line having one end attached to a point of the second assembly.

11. Apparatus according to claim 8, wherein the self-contained measurement means comprises a winder fitted to the cradle of the first assembly, the winder receiving a line having one end attached to a point of the second assembly.

12. Apparatus according to claim 3, the apparatus being fitted with signaling means for indicating whether the optical reference mark associated with the second camera is in the field of view of the first camera while the optical reference mark associated with the first camera is simultaneously in the field of view of the second camera.

* * * * *